(12) United States Patent
Mostafa et al.

(10) Patent No.: US 10,769,415 B1
(45) Date of Patent: Sep. 8, 2020

(54) DETECTION OF IDENTITY CHANGES DURING FACIAL RECOGNITION ENROLLMENT PROCESS

(71) Applicant: Apple Inc., Cupertino, CA (US)

(72) Inventors: Eslam A. Mostafa, Sunnyvale, CA (US); Hao Tang, Cupertino, CA (US); Feng Tang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 111 days.

(21) Appl. No.: 16/119,798

(22) Filed: Aug. 31, 2018

Related U.S. Application Data

(60) Provisional application No. 62/556,820, filed on Sep. 11, 2017, provisional application No. 62/556,404, filed on Sep. 9, 2017.

(51) Int. Cl.
*G06K 9/00* (2006.01)
*H04N 5/225* (2006.01)
*G06K 9/62* (2006.01)
*G06T 7/521* (2017.01)

(52) U.S. Cl.
CPC ..... *G06K 9/00288* (2013.01); *G06K 9/00255* (2013.01); *G06K 9/00261* (2013.01); *G06K 9/00268* (2013.01); *G06K 9/6202* (2013.01); *G06K 9/622* (2013.01); *G06T 7/521* (2017.01); *H04N 5/2256* (2013.01); *G06T 2207/10028* (2013.01); *G06T 2207/10048* (2013.01); *G06T 2207/30201* (2013.01)

(58) Field of Classification Search
None
See application file for complete search history.

(56) References Cited

U.S. PATENT DOCUMENTS

| | | | |
|---|---|---|---|
| 7,502,496 B2 | 3/2009 | Kozakaya et al. | |
| 7,606,392 B2 * | 10/2009 | Gordon | G06T 7/246 382/103 |
| 8,296,573 B2 * | 10/2012 | Bolle | G06F 21/32 713/186 |

(Continued)

OTHER PUBLICATIONS

"Windows Hello face authentication | Microsoft Docs", https://docs.microsoft.com/en-us/windows-hardware/design/device-experiences/windows-hello-face-authentication; May 2, 2017, 17 pages.

*Primary Examiner* — Christopher Braniff
(74) *Attorney, Agent, or Firm* — Kowert, Hood, Munyon, Rankin & Goetzel, P.C.; Gareth M. Sampson

(57) ABSTRACT

A device with a camera may utilize an enrollment process to capture images of an authorized user to enroll the user for a facial recognition authorization process. The enrollment process may include one or more processes that identify if an identity of the authorized user (e.g., the subject of the enrollment process) has switched during the enrollment process. The processes may include detection and verification of the switch in identities by comparing features of subjects in images as the images are captured during the enrollment process. If the identity of the subject is determined to be switched from the authorized user during the enrollment process, the enrollment process may be restarted. Additionally, clustering of feature vectors from the enrollment images may be used to remove outlying feature vectors that may be generated from one or more images of a subject other than the authorized user.

20 Claims, 8 Drawing Sheets

(56) References Cited

U.S. PATENT DOCUMENTS 8,886,953 B1 11/2014 Sipe et al.
2015/0310259 A1* 10/2015 Lau .......................... G07C 9/00
382/118

* cited by examiner

DETECTION OF IDENTITY CHANGES DURING FACIAL RECOGNITION ENROLLMENT PROCESS

PRIORITY CLAIM

This patent claims priority to U.S. Provisional Patent Application No. 62/556,404 to Mostafa et al., entitled "DETECTION OF IDENTITY CHANGES DURING FACIAL RECOGNITION PROCESS", filed Sep. 9, 2017; and to U.S. Provisional Patent Application No. 62/556,820 to Mostafa et al., entitled "DETECTION OF IDENTITY CHANGES DURING FACIAL RECOGNITION ENROLLMENT PROCESS", filed Sep. 11, 2017; each of which are incorporated by reference in their entirety.

BACKGROUND

1. Technical Field

Embodiments described herein relate to methods and systems for face detection in images capture by a camera on a device.

2. Description of Related Art

Biometric authentication processes are being used more frequently to allow users to more readily access their devices without the need for passcode or password authentication. One example of a biometric authentication process is fingerprint authentication using a fingerprint sensor. Facial recognition is another biometric process that may be used for authentication of an authorized user of a device. Facial recognition processes are generally used to identify individuals in an image and/or compare individuals in images to a database of individuals to match the faces of individuals.

For authentication using facial recognition, an enrollment process may be used to obtain enrollment (e.g., reference or template) images of an authorized user of the device. During a typical enrollment process, multiple enrollment images are taken of the authorized user. While taking the multiple enrollment images, it is possible that multiple users (e.g., multiple subjects) are captured in the enrollment images. For example, multiple subjects may be involved in enrollment if the primary (authorized) user seeks assistance from an additional person (e.g., a salesperson or technical assistance person) during the enrollment process. In such cases, the device may inadvertently capture enrollment images of the additional person during the enrollment process. If the enrollment images with the additional person are used to create a facial recognition profile for the device along with enrollment images of the primary user, the accuracy of facial recognition authentication for the primary user (e.g., the intended subject of the profile) may be reduced.

SUMMARY

In certain embodiments, during an enrollment process (e.g., a facial recognition enrollment authorization process), a device may capture a first set of images of a face of a first subject (e.g., a user trying to be authorized for facial recognition authorization by the device). For example, the first set of images of the face of the first subject may be captured while the face of the first subject is in a selected pose and/or has selected facial feature movements (e.g., mouth shape, eye look, etc.). While the enrollment process continues, one or more additional images of a subject using the device (e.g., the first subject and/or an additional subject) may be captured by the device. For example, additional images (e.g., a second set of images) may be captured when the device prompts the user to capture additional images for different poses and/or different facial feature movements (e.g., different mouth shape, different eye looks, etc.) of the user.

In certain embodiments, as the images in the second set of images are captured (e.g., as second images are captured), the subject in the second images may be compared to the subject in the first set of images (e.g., the first images of the first subject). In certain embodiments, the subjects are compared by comparing feature vectors generated by encoding facial features in the images in a feature space. The subject in the second images may be compared over time (e.g., by comparing images as the images are captured) to the subject in the first images (e.g., the first subject). If the subject in the second images is consistently determined to be a different subject than the subject in the first images (e.g., a selected number of consecutive second images are determined to be a different subject), then the enrollment process may be stopped and a prompt or other command may be given to start the enrollment process over (e.g., restart the enrollment process).

In some embodiment, the feature vectors for both the first images and the second images are combined in the feature space. Clustering (e.g., classification) of the feature vectors in the feature space may be used to remove outliers from the enrollment signature. Outliers in the feature space (e.g., outlying feature vectors in the feature space) may be more likely to be due to different users in the images than due to different poses of the same user (e.g., the primary user or first subject).

BRIEF DESCRIPTION OF THE DRAWINGS

Features and advantages of the methods and apparatus of the embodiments described in this disclosure will be more fully appreciated by reference to the following detailed description of presently preferred but nonetheless illustrative embodiments in accordance with the embodiments described in this disclosure when taken in conjunction with the accompanying drawings in which.

Figure 1:
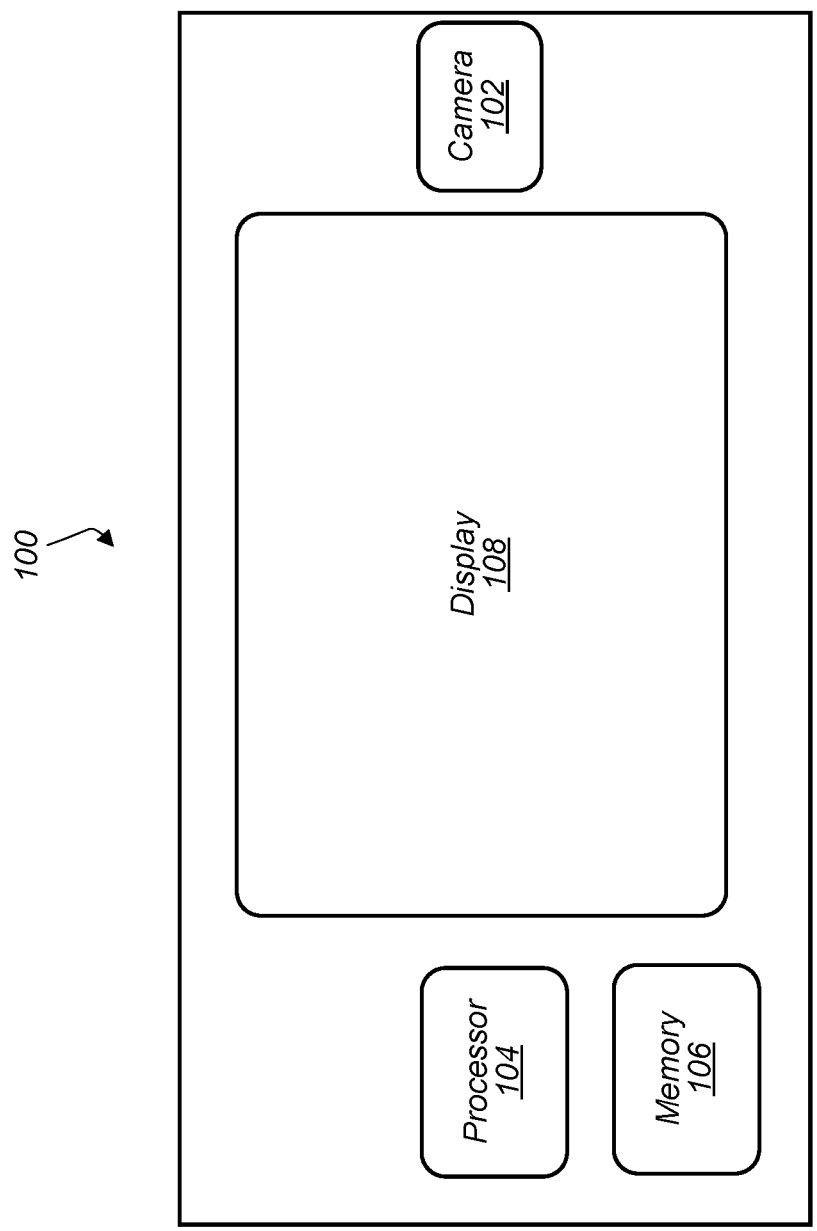
FIG. 1 depicts a representation of an embodiment of a device including a camera.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits and/or memory storing program instructions executable to implement the operation. The memory can include volatile memory such as static or dynamic random access memory and/or nonvolatile memory such as optical or magnetic disk storage, flash memory, programmable read-only memories, etc. The hardware circuits may include any combination of combinatorial logic circuitry, clocked storage devices such as flops, registers, latches, etc., finite state machines, memory such as static random access memory or embedded dynamic random access memory, custom designed circuitry, programmable logic arrays, etc. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112(f) interpretation for that unit/circuit/component.

In an embodiment, hardware circuits in accordance with this disclosure may be implemented by coding the description of the circuit in a hardware description language (HDL) such as Verilog or VHDL. The HDL description may be synthesized against a library of cells designed for a given integrated circuit fabrication technology, and may be modified for timing, power, and other reasons to result in a final design database that may be transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and may further include other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION OF EMBODIMENTS

This specification includes references to "one embodiment" or "an embodiment." The appearances of the phrases "in one embodiment" or "in an embodiment" do not necessarily refer to the same embodiment, although embodiments that include any combination of the features are generally contemplated, unless expressly disclaimed herein. Particular features, structures, or characteristics may be combined in any suitable manner consistent with this disclosure.

As described herein, one aspect of the present technology is the gathering and use of data available from various sources to improve the operation and access to devices. The present disclosure contemplates that in some instances, this gathered data may include personal information data that uniquely identifies or can be used to contact or locate a specific person. Such personal information data can include image data (e.g., data from images of the user), demographic data, location-based data, telephone numbers, email addresses, home addresses, or any other identifying information. For image data, the personal information data may only include data from the images of the user and not the images themselves.

The present disclosure recognizes that the use of such personal information data, in the present technology, can be used to the benefit of users. For example, the personal information data can be used to control unlocking and/or authorizing devices using facial recognition. Accordingly, use of such personal information data enables calculated control of access to devices. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, in the case of unlocking and/or authorizing devices using facial recognition, personal information from users should be collected for legitimate and reasonable uses of the entity, as such uses pertain only to operation of the devices, and not shared or sold outside of those legitimate uses. Further, such collection should occur only after receiving the informed consent of the user and the personal information data should remain secured on the device on which the personal information is collected. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services.

FIG. 1 depicts a representation of an embodiment of a device including a camera. In certain embodiments, device 100 includes camera 102, processor 104, memory 106, and display 108. Device 100 may be a small computing device, which may be, in some cases, small enough to be handheld (and hence also commonly known as a handheld computer or simply a handheld). In certain embodiments, device 100 is any of various types of computer systems devices which are mobile or portable and which perform wireless communications using WLAN communication (e.g., a "mobile device"). Examples of mobile devices include mobile telephones or smart phones, and tablet computers. Various other types of devices may fall into this category if they include wireless or RF communication capabilities (e.g., Wi-Fi, cellular, and/or Bluetooth), such as laptop computers, portable gaming devices, portable Internet devices, and other handheld devices, as well as wearable devices such as smart watches, smart glasses, headphones, pendants, earpieces, etc. In general, the term "mobile device" can be broadly defined to encompass any electronic, computing, and/or telecommunications device (or combination of devices) which is easily transported by a user and capable of wireless communication using, for example, WLAN, Wi-Fi, cellular, and/or Bluetooth. In certain embodiments, device 100 includes any device used by a user with processor 104, memory 106, and display 108. Display 108 may be, for example, an LCD screen or touchscreen. In some embodiments, display 108 includes a user input interface for device 100 (e.g., the display allows interactive input for the user).

Figure 2:
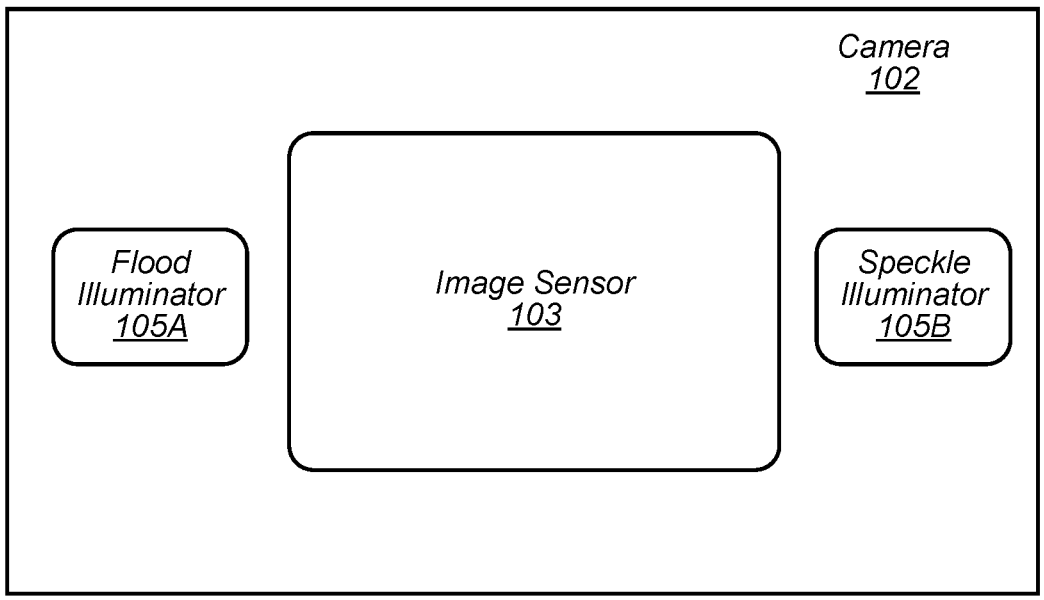
FIG. 2 depicts a representation of an embodiment of a camera.

Camera 102 may be used to capture images of the external environment of device 100. In certain embodiments, camera 102 is positioned to capture images in front of display 108. Camera 102 may be positioned to capture images of the user (e.g., the user's face) while the user interacts with display 108. FIG. 2 depicts a representation of an embodiment of camera 102. In certain embodiments, camera 102 includes one or more lenses and one or more image sensors 103 for capturing digital images. Digital images captured by camera 102 may include, for example, still images, video images, and/or frame-by-frame images.

In certain embodiments, camera 102 includes image sensor 103. Image sensor 103 may be, for example, an array of sensors. Sensors in the sensor array may include, but not be limited to, charge coupled device (CCD) and/or complementary metal oxide semiconductor (CMOS) sensor elements to capture infrared images (IR) or other non-visible electromagnetic radiation. In some embodiments, camera 102 includes more than one image sensor to capture multiple types of images. For example, camera 102 may include both IR sensors and RGB (red, green, and blue) sensors. In certain embodiments, camera 102 includes illuminators 105 for illuminating surfaces (or subjects) with the different types of light detected by image sensor 103. For example, camera 102 may include an illuminator for visible light (e.g., a "flash illuminator), illuminators for RGB light, and/or illuminators for infrared light (e.g., a flood IR source and a speckle pattern projector). In some embodiments, the flood IR source and speckle pattern projector are other wavelengths of light (e.g., not infrared). In certain embodiments, illuminators 105 include an array of light sources such as, but not limited to, VCSELs (vertical-cavity surface-emitting lasers). In some embodiments, image sensors 103 and illuminators 105 are included in a single chip package. In some embodiments, image sensors 103 and illuminators 105 are located on separate chip packages.

In certain embodiments, image sensor 103 is an IR image sensor and the image sensor is used to capture infrared images used for face detection, facial recognition authentication, and/or depth detection. Other embodiments of image sensor 103 (e.g., an RGB image sensor) may also be contemplated for use in face detection, facial recognition authentication, and/or depth detection as described herein. For face detection, illuminator 105A may provide flood IR illumination to flood the subject with IR illumination (e.g., an IR flashlight) and image sensor 103 may capture images of the flood IR illuminated subject. Flood IR illumination images may be, for example, two-dimensional images of the subject illuminated by IR light. For depth detection or generating a depth map image, illuminator 105B may provide IR illumination with a speckle pattern. The speckle pattern may be a pattern of light spots (e.g., a pattern of dots) with a known, and controllable, configuration and pattern projected onto a subject. Illuminator 105B may include a VCSEL array configured to form the speckle pattern or a light source and patterned transparency configured to form the speckle pattern. The configuration and pattern of the speckle pattern provided by illuminator 105B may be selected, for example, based on a desired speckle pattern density (e.g., dot density) at the subject. Image sensor 103 may capture images of the subject illuminated by the speckle pattern. The captured image of the speckle pattern on the subject may be assessed (e.g., analyzed and/or processed) by an imaging and processing system (e.g., an image signal processor (ISP) as described herein) to produce or estimate a three-dimensional map of the subject (e.g., a depth map or depth map image of the subject). Examples of depth map imaging are described in U.S. Pat. No. 8,150,142 to Freedman et al., U.S. Pat. No. 8,749,796 to Pesach et al., and U.S. Pat. No. 8,384,997 to Shpunt et al., which are incorporated by reference as if fully set forth herein, and in U.S. Patent Application Publication No. 2016/0178915 to Mor et al., which is incorporated by reference as if fully set forth herein.

In certain embodiments, images captured by camera 102 include images with the user's face (e.g., the user's face is included in the images). An image with the user's face may include any digital image with at least some portion of the user's face shown within the frame of the image. Such an image may include just the user's face or may include the user's face in a smaller part or portion of the image. The user's face may be captured with sufficient resolution in the image to allow image processing of one or more features of the user's face in the image.

Figure 3:
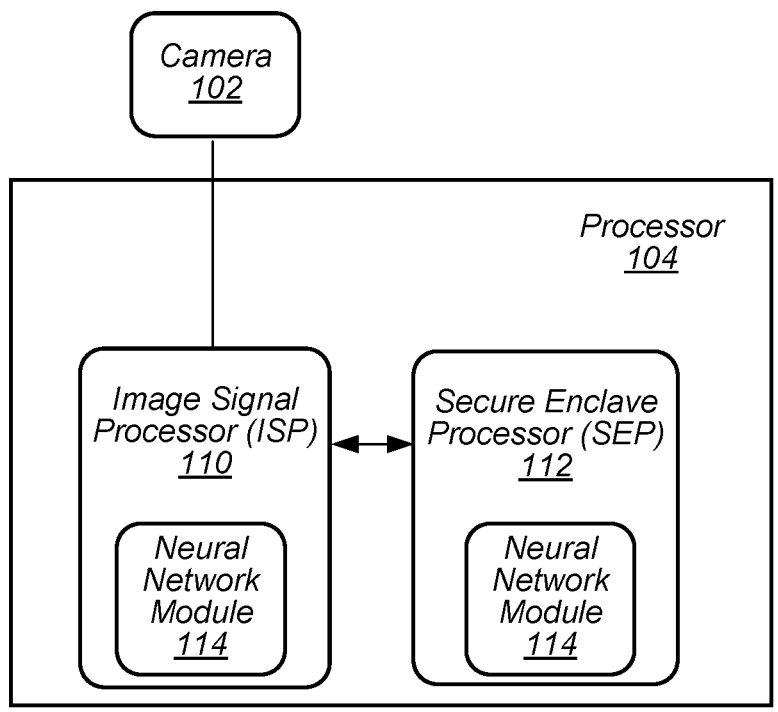
FIG. 3 depicts a representation of an embodiment of a processor on a device.

Images captured by camera 102 may be processed by processor 104. FIG. 3 depicts a representation of an embodiment of processor 104 included in device 100. Processor 104 may include circuitry configured to execute instructions defined in an instruction set architecture implemented by the processor. Processor 104 may execute the main control software of device 100, such as an operating system. Generally, software executed by processor 104 during use may control the other components of device 100 to realize the desired functionality of the device. The processors may also execute other software. These applications may provide user functionality, and may rely on the operating system for lower-level device control, scheduling, memory management, etc.

In certain embodiments, processor 104 includes image signal processor (ISP) 110. ISP 110 may include circuitry suitable for processing images (e.g., image signal processing circuitry) received from camera 102. ISP 110 may include any hardware and/or software (e.g., program instructions) capable of processing or analyzing images captured by camera 102.

In certain embodiments, processor 104 includes secure enclave processor (SEP) 112. In some embodiments, SEP 112 is involved in a facial recognition authentication process involving images captured by camera 102 and processed by ISP 110. SEP 112 may be a secure circuit configured to authenticate an active user (e.g., the user that is currently using device 100) as authorized to use device 100. A "secure circuit" may be a circuit that protects an isolated, internal resource from being directly accessed by an external circuit. The internal resource may be memory (e.g., memory 106) that stores sensitive data such as personal information (e.g., biometric information, credit card information, etc.), encryptions keys, random number generator seeds, etc. The internal resource may also be circuitry that performs services/operations associated with sensitive data. As described herein, SEP 112 may include any hardware and/or software (e.g., program instructions) capable of authenticating a user using the facial recognition authentication process. The facial recognition authentication process may authenticate a user by capturing images of the user with camera 102 and comparing the captured images to previously collected images of an authorized user for device 100. In some embodiments, the functions of ISP 110 and SEP 112 may be performed by a single processor (e.g., either ISP 110 or SEP 112 may perform both functionalities and the other processor may be omitted).

Figures 4, 5, 6:
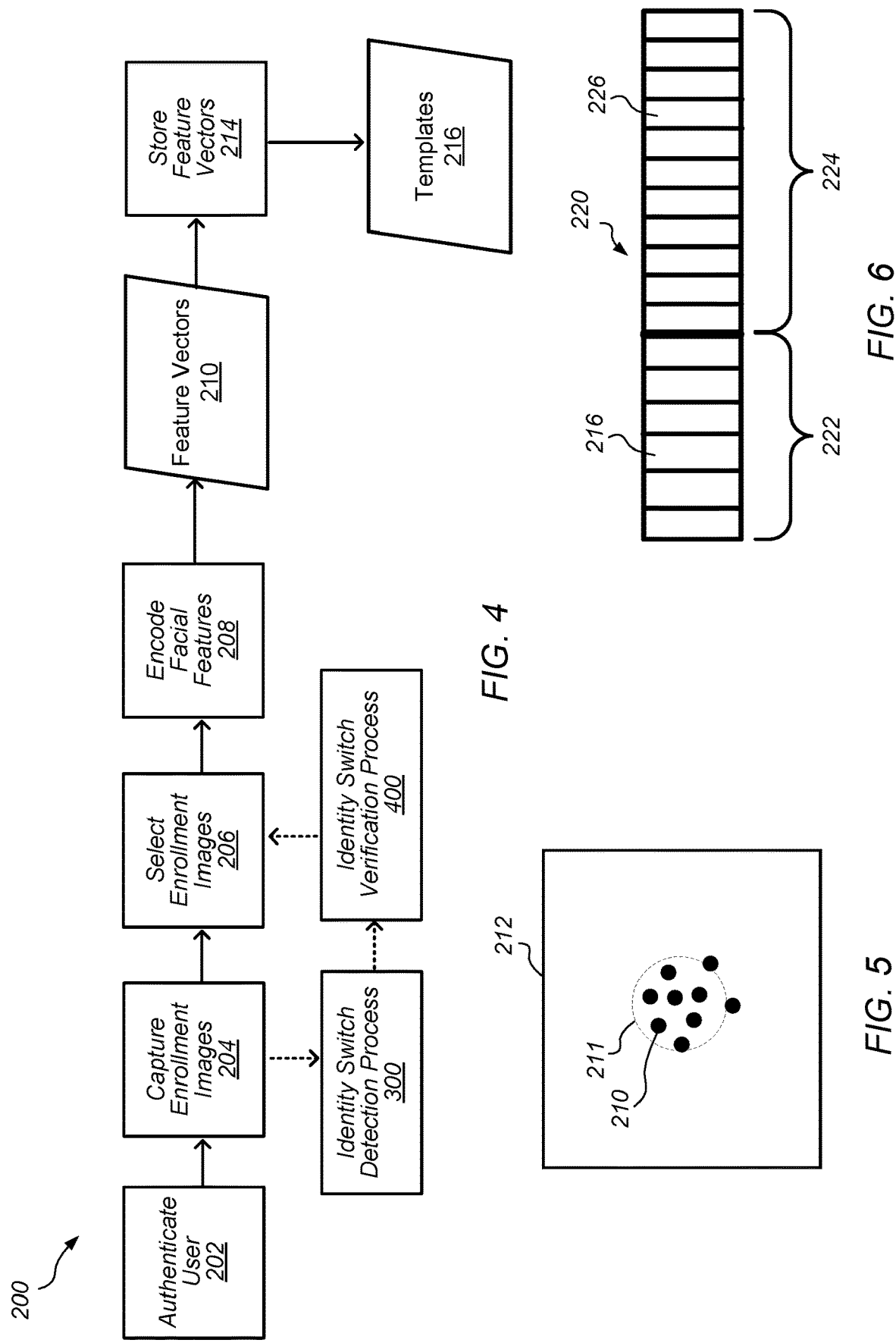
FIG. 4 depicts a flowchart of an embodiment of an image enrollment process for an authorized user of a device.
FIG. 5 depicts a representation of an embodiment of a feature space with feature vectors after an enrollment process.
FIG. 6 depicts a representation of an embodiment of a template space of a memory.

In certain embodiments, processor 104 performs an enrollment process (e.g., image enrollment process 200, as shown in FIG. 4, or a registration process) to capture images (e.g., the previously collected images) for an authorized user of device 100. During the enrollment process, camera module 102 may capture (e.g., collect) images and/or image data from an authorized user in order to permit SEP 112 (or another security process) to subsequently authenticate the user using the facial recognition authentication process. In some embodiments, the images and/or image data (e.g., feature vector data from the images) from the enrollment process are used to generate templates in device 100. The templates may be stored, for example, in a template space in memory 106 of device 100. In some embodiments, the template space may be updated by the addition and/or subtraction of templates from the template space. A template update process may be performed by processor 104 to add and/or subtract templates from the template space. For example, the template space may be updated with additional templates to adapt to changes in the authorized user's appearance and/or changes in hardware performance over time. Templates may be subtracted from the template space to compensate for the addition of templates when the template space for storing templates is full.

In some embodiments, camera module 102 captures multiple pairs of images for a facial recognition session. Each pair may include an image captured using a two-dimensional capture mode (e.g., a flood IR image) and an image captured using a three-dimensional capture mode (e.g., a depth map image). In certain embodiments, ISP 110 and/or SEP 112 process the flood IR images and depth map images independently of each other before a final authentication decision is made for the user. For example, ISP 110 may process the images independently to determine characteristics of each image separately. SEP 112 may then compare the separate image characteristics with stored templates for each type of image to generate an authentication score (e.g., a matching score or other ranking of matching between the user in the captured image and in the stored templates) for each separate image. The authentication scores for the separate images (e.g., the flood IR and depth map images) may be combined to make a decision on the identity of the user and, if authenticated, allow the user to use device 100 (e.g., unlock the device).

In some embodiments, ISP 110 and/or SEP 112 combine the images in each pair to provide a composite image that is used for facial recognition. In some embodiments, ISP 110 processes the composite image to determine characteristics of the image, which SEP 112 may compare with the stored templates to make a decision on the identity of the user and, if authenticated, allow the user to use device 100.

In some embodiments, the combination of flood IR image data and depth map image data may allow for SEP 112 to compare faces in a three-dimensional space. In some embodiments, camera module 102 communicates image data to SEP 112 via a secure channel. The secure channel may be, for example, either a dedicated path for communicating data (i.e., a path shared by only the intended participants) or a dedicated path for communicating encrypted data using cryptographic keys known only to the intended participants. In some embodiments, camera module 102 and/or ISP 110 may perform various processing operations on image data before supplying the image data to SEP 112 in order to facilitate the comparison performed by the SEP.

In certain embodiments, processor 104 operates one or more machine learning models. Machine learning models may be operated using any combination of hardware and/or software (e.g., program instructions) located in processor 104 and/or on device 100. In some embodiments, one or more neural network modules 114 are used to operate the machine learning models on device 100. Neural network modules 114 may be located in ISP 110 and/or SEP 112.

Neural network module 114 may include any combination of hardware and/or software (e.g., program instructions) located in processor 104 and/or on device 100. In some embodiments, neural network module 114 is a multi-scale neural network or another neural network where the scale of kernels used in the network can vary. In some embodiments, neural network module 114 is a recurrent neural network (RNN) such as, but not limited to, a gated recurrent unit (GRU) recurrent neural network or a long short-term memory (LSTM) recurrent neural network.

Neural network module 114 may include neural network circuitry installed or configured with operating parameters that have been learned by the neural network module or a similar neural network module (e.g., a neural network module operating on a different processor or device). For example, a neural network module may be trained using training images (e.g., reference images) and/or other training data to generate operating parameters for the neural network circuitry. The operating parameters generated from the training may then be provided to neural network module 114 installed on device 100. Providing the operating parameters generated from training to neural network module 114 on device 100 allows the neural network module to operate using training information programmed into the neural network module (e.g., the training-generated operating parameters may be used by the neural network module to operate on and assess images captured by the device).

FIG. 4 depicts a flowchart of an embodiment of image enrollment process 200 for an authorized user of device 100. Process 200 may be used to create an enrollment profile for an authorized user of device 100 that is stored in the device (e.g., in a memory coupled to SEP 112). The enrollment profile may include one or more templates for the authorized user created using process 200. In some embodiments, process 200 is used to create two templates for the authorized user. A first template may be a full face template (e.g., a template used with the full face facial recognition authentication process) and the second template may be a partial face template (e.g., a template used with the partial face facial recognition authentication process). The enrollment profile and the templates associated with the enrollment profile may be used in a facial recognition authentication process to allow (e.g., authorize) the user to use the device and/or perform operations on the device (e.g., unlock the device).

In certain embodiments, process 200 is used when device 100 is used a first time by the authorized user and/or when the user opts to create an enrollment profile for a facial recognition process. For example, process 200 may be initiated when device 100 is first obtained by the authorized user (e.g., purchased by the authorized user) and turned on for the first time by the authorized user. In some embodiments, process 200 may be initiated by the authorized user when the user desires to enroll in a facial recognition process, update security settings for device 100, re-enroll, and/or add an enrollment profile on the device.

In certain embodiments, process 200 begins with authenticating the user in 202. In 202, the user may be authenticated on device 100 using a non-facial authentication process. For example, the user may be authenticated as an authorized user by entering a passcode, entering a password, or using another user authentication protocol other than facial recognition. After the user is authenticated in 202, one or more enrollment (e.g., reference or registration) images of the user are captured in 204. The enrollment images may include images of the user illuminated by flood illuminator 105A (e.g., flood IR images) and/or images of the user illuminated by speckle illuminator 105B (e.g., depth map images). As described herein, flood IR images and depth map images may be used independently and/or in combination in facial recognition processes on device 100 (e.g. the images may independently be used to provide an authentication decision and the decisions may be combined to determine a final decision on user authentication).

The enrollment images may be captured using camera 102 as the user interacts with device 100. For example, the enrollment images may be captured as the user follows prompts on display 108 of device 100. The prompts may include instructions for the user to make different motions and/or poses while the enrollment images are being captured. During 204, camera 102 may capture multiple images for each motion and/or pose performed by the user. Capturing images for different motions and/or different poses of the user where the images still have a relatively clear depiction of the user may be useful in providing a better variety of enrollment images that enable the user to be authenticated without having to be in a limited or restricted position relative to camera 102 on device 100.

After the multiple enrollment images are captured in 204, selection of enrollment images for further image processing may be made in 206. Selection of enrollment images 206, and further processing of the images, may be performed by ISP 110 and/or SEP 112. Selection of enrollment images for further processing may include selecting images that are suitable for generating templates. For example, the selection of images that are suitable for use generating templates in 206 may include assessing one or more selected criteria for the images and selecting images that meet the selected criteria. The selected images may be used to generate templates for the user. Selected criteria may include, but not be limited to, the face of the user being in the field of view of the camera, a pose of the user's face being proper (e.g., the user's face is not turned to far in any direction from the camera (i.e., the pitch, yaw, and/or roll of the face are not above certain levels), a distance between camera 102 and the face of the user being in a selected distance range, the face of the user having occlusion below a minimum value (e.g., the user's face is not occluded (blocked) more than a minimum amount by another object), the user paying attention to the camera (e.g., eyes of the user looking at the camera), eyes of the user not being closed, and proper lighting (illumination) in the image. In some embodiments, if more than one face is detected in an enrollment image, the enrollment image is rejected and not used (e.g., not selected) for further processing. Selection of images suitable for further processing may be rule based on the images meeting a certain number of the selected criteria or all of the selected criteria. In some embodiments, occlusion maps and/or landmark feature maps are used in identifying features of the user (e.g., facial features such as eyes, nose, and mouth) in the images and assessing the selected criteria in the images.

After images are selected in 206, features of the user in the selected (template) images may be encoded in 208. Encoding of the selected images may include encoding features (e.g., facial features) of the user to define the features in the images as one or more feature vectors in a feature space. Feature vectors 210 may be the output of the encoding in 208. A feature space may be an n-dimensional feature space. A feature vector may be an n-dimensional vector of numerical values that define features from the image in the feature space (e.g., the feature vector may be a vector of numerical values that define facial features of the user in the image).

FIG. 5 depicts a representation of an embodiment of feature space 212 with feature vectors 210. Each feature vector 210 (black dot) may define facial features for the user from either a single image, from a composite image (e.g., an image that is a composite of several images), or from multiple images. As feature vectors 210 are generated from a single user's facial features, the feature vectors may be similar to one another because the feature vectors are associated with the same person and may have some "clustering", as shown by circle 211 in FIG. 5.

As shown in FIG. 4, process 200 may include, in 214, storing feature vectors 210 in a memory of device 100 (e.g., a memory protected by SEP 112). In certain embodiments, feature vectors 210 are stored as static templates 216 (e.g., enrollment templates or reference templates) in a template space of the memory (e.g., template space 220 described below). Static templates 216 may be used for the enrollment profile created by process 200. In some embodiments, static templates 216 (and other templates described herein) include separate templates for feature vectors obtained from the enrollment flood IR images and for feature vectors obtained from the enrollment depth map images. It is to be understood that the separate templates obtained from flood IR images and depth map images may be used independently and/or in combination during additional processes described herein. For simplicity in this disclosure, static templates 216 are described generically and it should be understood that static templates 216 (and the use of the templates) may refer to either templates obtained from flood IR images or templates obtained from depth map images. In some embodiments, a combination of the flood IR images and depth map images may be used to generate templates. For example, pairs of feature vectors obtained from flood IR images and depth map images may be stored in static templates 216 to be used in one or more facial recognition processes on device 100.

FIG. 6 depicts a representation of an embodiment of template space 220 for an enrollment profile in memory 106 of device 100. In certain embodiments, template space 220 is located in a portion of memory 106 of device 100 protected by SEP 112. In some embodiments, template space 220 includes static portion 222 and dynamic portion 224. Static templates 216 may be, for example, added to static portion 222 of template space 220 (e.g., the templates are permanently added to the memory and are not deleted or changed unless the device is reset). In some embodiments, static portion 222 includes a certain number of static templates 216. For example, for the embodiment of template space 220 depicted in FIG. 6, six static templates 216 are allowed in static portion 222. In some embodiments, nine static templates 216 may be allowed in static portion 222. Other numbers of static templates 216 in static portion 222 may also be contemplated. After the enrollment process for the enrollment profile is completed and static templates 216 are added to static portion 222, additional dynamic templates 226 may be added to dynamic portion 224 of template space 220 for the enrollment profile (e.g., a portion from which templates may be added and deleted without a device reset being needed).

Static templates 216 may thus be enrollment templates (or reference templates) generated by enrollment process 200 for the enrollment profile associated with the enrollment process. After enrollment process 200 is completed, a selected number of static templates 216 are stored in static portion 222 of template space 220 for the enrollment profile. The number of static templates 216 stored in static portion 222 after enrollment process 200 may vary depending on, for example, the number of different feature vectors obtained during the enrollment process, which may be based on the number of images selected to be suitable for use as template images, or a desired number of templates for the device. After enrollment process 200, static templates 216 include feature vectors 210 (e.g., the enrollment or reference feature vectors) that can be used for facial recognition of the authorized user associated with the enrollment profile.

In some embodiments, template space 220 may be used in a facial recognition authentication process. The facial recognition authentication process may be used to authenticate a user as an authorized user of device 100 using facial recognition of the user. During the facial recognition authentication process, images captured of the user during an unlock attempt may be compared to the images in template space 220 (e.g., by comparing feature vectors of the images) to determine if the user attempting to unlock the device is an authorized user of the device. Authentication of the authorized user may allow the user to access and use device 100 (e.g., unlock the device).

In certain embodiments, some of the images captured during 204 in image enrollment process 200, as shown in FIG. 4, are processed using identity switch detection process 300 and identity switch verification process 400 before continuing with the image enrollment process (e.g., before proceeding to selection of enrollment images in 206). Identity switch detection process 300 and identity switch verification process 400 may be used to detect and verify if the identity of a subject has switched during image enrollment process 200. In some embodiments, process 300 and process 400 are initiated after at least one static template 216 has been generated (e.g., after at least one image of the subject has been added to the template space).

Figure 7:
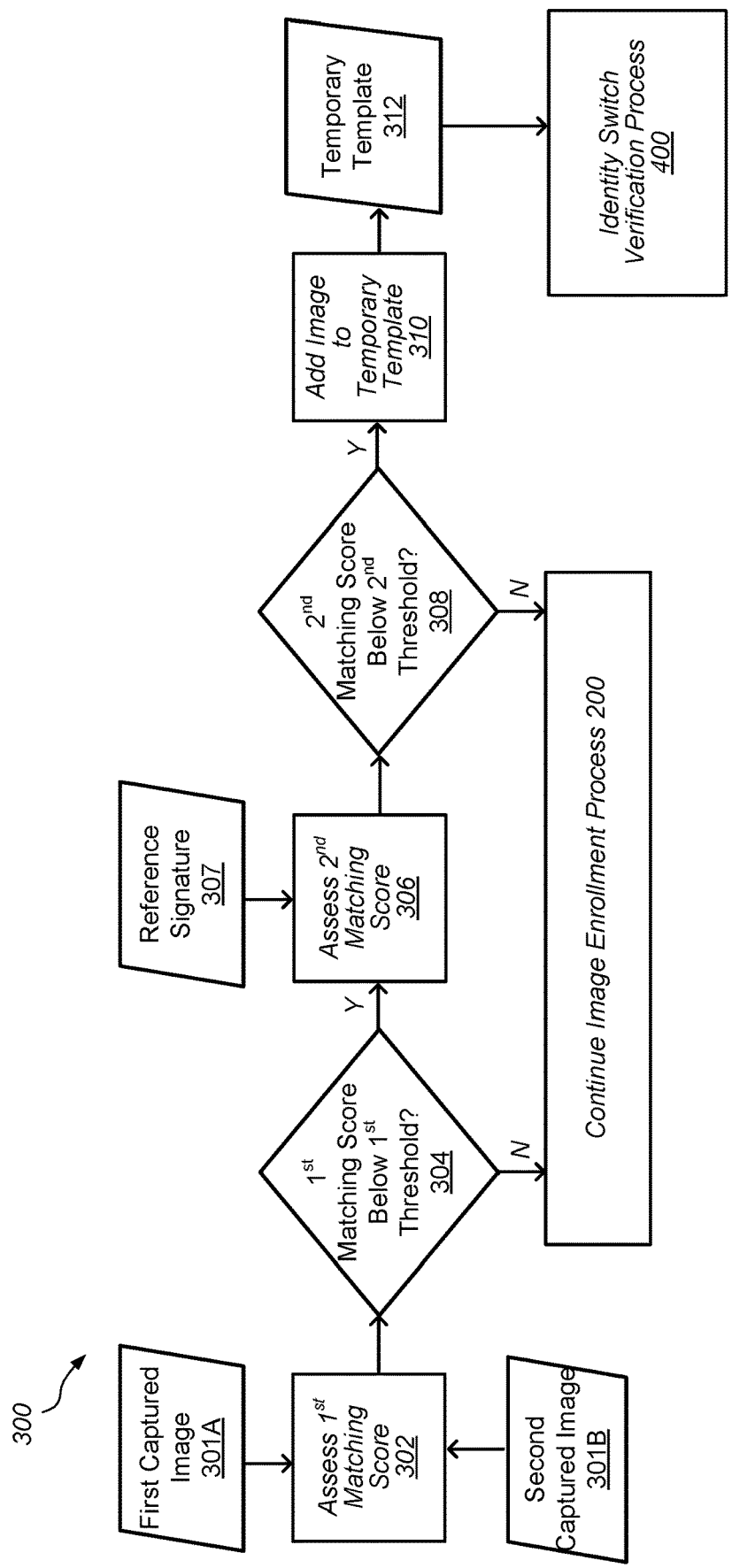
FIG. 7 depicts a representation of an embodiment of an identity switch detection process.

FIG. 7 depicts a representation of an embodiment of identity switch detection process 300. Process 300 may be used to determine (e.g., detect) if an identity of a subject (e.g., user) has changed (e.g., switched) between one or more images (or one or more sets of images) captured during 204 in enrollment process 200 (shown in FIG. 4). Process 300 may begin with assessing a first matching score in 302. The first matching score may be assessed between first captured image 301A and second captured image 301B in 302. First captured image 301A may be an image that has been processed using process 200 to generate static template 216 (e.g., an enrollment image selected in 206, as shown in FIG. 4). In certain embodiments, second captured image 310B used in process 300 to assess the first matching score in 302 is the image captured subsequent to first captured image 301A (e.g., the second captured image and the first captured image are consecutively captured images with the second captured image being taken after static template 216 is generated using the first captured image).

As described herein, a "matching score" may be determined by encoding features (e.g., facial features) in different images (e.g., first captured image 301A and second captured image 301B) to generate feature vectors and comparing the generated feature vectors. Comparison of the feature vectors of the different images may provide a matching score that provides an assessment of similarities between the different images. The closer (e.g., the less distance or less differences) that the feature vectors in a first image and the feature vectors in a second image are, the higher the matching score between the first and second images. Thus, the higher the assessed matching score is, the more similar the subjects in the different images.

As described herein for process 300, "first captured image" or "second captured image" may be a single captured image or a set of captured images (e.g., a set of multiple captured images). For example, in one embodiment, "first captured image" may be a set of multiple images taken (captured) while a face of a subject is in a selected pose and/or has selected movements during the enrollment process. The multiple images may be taken/captured in rapid succession while the subject is illuminated with a specific illumination (e.g., either flood IR illumination or speckle pattern illumination) to substantially capture "a moment" in time. For example, the multiple images may be 60 frames captured in a second (e.g., 60 fps) while being illuminated with the flood IR illumination. In such an embodiment, the "first captured image" may be a composite image of the multiple images in the set of images taken while being illuminated with the specific illumination. For the composite image, the feature vectors for images in the set of images may be combined to provide a set of feature vectors that describe the "first captured image" in a feature space. Similarly, the "second captured image" may be a composite image of a second set of multiple images while being illuminated with the specific illumination. In some embodiments, the "second captured image" is taken with the face of the subject in a selected pose and/or with selected movements that are different than the pose and/or movements of the "first captured image".

For process 300, the first matching score assessed in 302 may be compared to a first threshold in 304. If the first matching score is above the first threshold ("N" in FIG. 7), then the identity of the subject in second captured image 301B may be assumed to be the same as the subject in first captured image 301A and enrollment process 200, shown in FIG. 4, may be continued by either capturing additional enrollment images in 204 (which may also be subject to assessment under process 300) or continuing the next steps of the enrollment process (e.g., continuing the steps in process 200 to generate static templates 216). If the first matching score is below the first threshold ("Y" in FIG. 7), then a second matching score may be assessed in 306.

Figure 8:
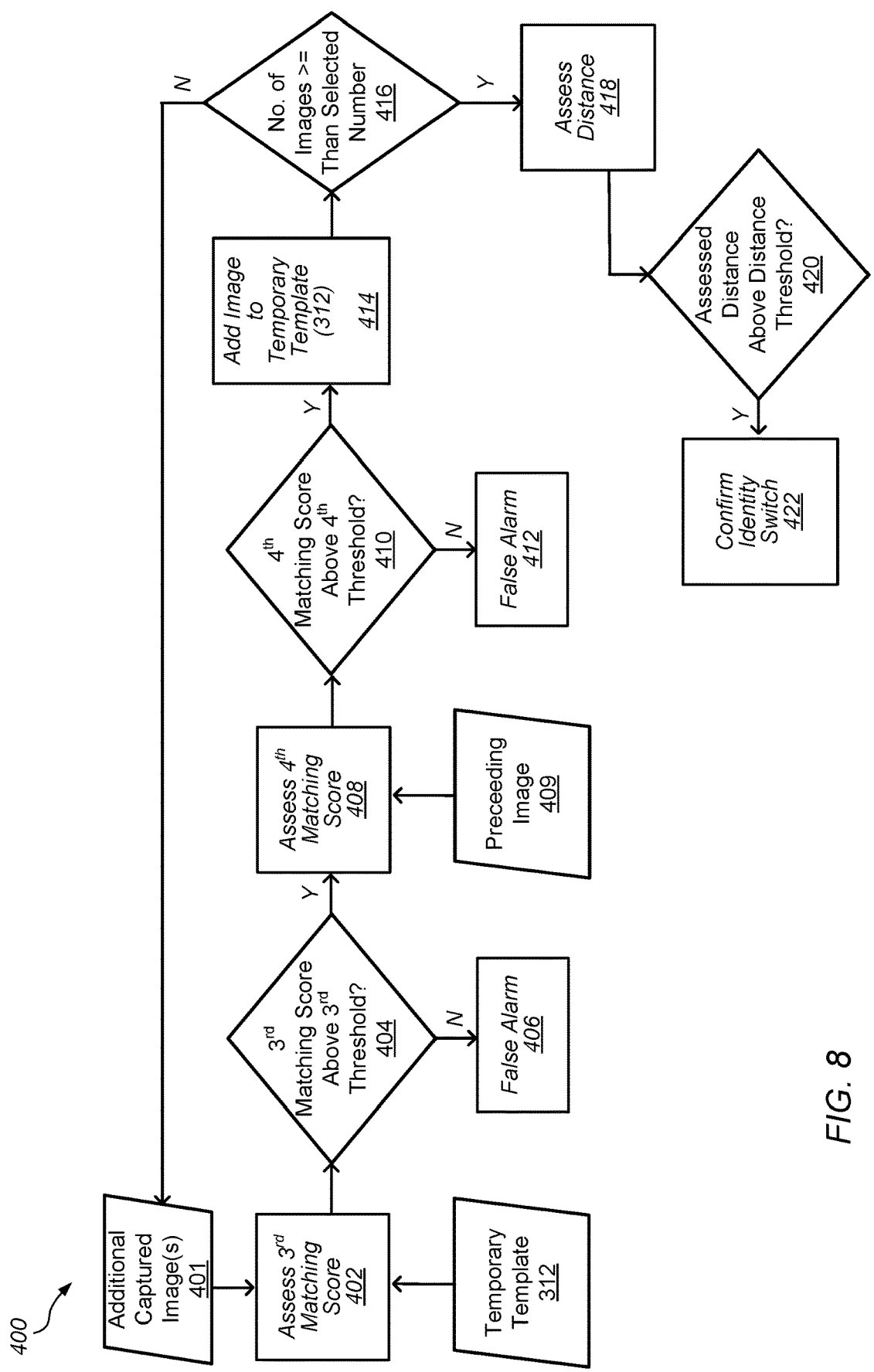
FIG. 8 depicts a representation of an embodiment of an identity switch verification process.

In certain embodiments, the second matching score assessed in 306 is a matching score between feature vectors in second captured image 301B and reference signature 307 (e.g., a set of reference feature vectors) for previously captured images. Reference signature 307 may be, for example, a set of feature vectors generated by averaging the feature vectors for all the images captured prior to capturing the second captured image during the enrollment process. In 308, the second matching score may be compared to a second threshold. If the second matching score is above the second threshold ("N"), then the identity of the subject in the second captured image may be assumed to be substantially similar to the subject in the reference signature and enrollment process 200, shown in FIG. 4, may be continued. If the second matching score is below the second threshold ("Y"), then the identity of the subject in the second captured image may be assumed to be a different person than the subject in the reference signature (e.g., a person that does not resemble the subject in the reference signature). Thus, when the second matching score is below the second threshold ("Y"), the second captured image may be added, in 310 to temporary template 312. Temporary template 312 may be provided to identity switch verification process 400 (shown in FIG. 8) for additional images taken/captured after the second captured image. Adding the second captured image to temporary template 312 may include adding the feature vectors for the second captured image to the temporary template. By adding the feature vectors for the second captured image to temporary template 312, the subject in the second captured image is provided as the subject in the temporary template FIG. 8 depicts a representation of an embodiment of identity switch verification process 400. Process 400 may be used to verify during the capture of additional images if the subject placed in temporary template 312 (e.g., the subject in second captured image 301B that has been identified as having different features by process 300) is a subject with a different identity from the subject enrolled by image enrollment process 200. One or more comparisons using the additional images captured may be used to verify if the subject in temporary template 312 is a different subject than the subject enrolled by image enrollment process 200 or if there was an error or other factor in identifying the subject in second captured image 301B as being a different subject than the subject enrolled by image enrollment process 200.

Process 400 may begin (e.g., be triggered) after the feature vectors for the second captured image are added to temporary template 312 in process 300, as described above. Process 400 may operate on additional images captured 401. Additional images capture 401 may include images after second captured image 301B as each additional image is captured. Process 400 may be used to verify if a change of identity has occurred by comparing the identity of the subject in each additional image captured after the second captured image with the identity of the subject in temporary template 312 (e.g., the identity of the subject in second captured image 301B).

Process 400 may begin by assessing a matching score (e.g., a third matching score) between feature vectors for additional image captured 401 and feature vectors in temporary template 312 in 402. In 404, the third matching score may be compared to another threshold (e.g., a third threshold). If the third matching score is less than the third threshold ("N"), then a "false alarm" may be determined in 406. The false alarm may be an indication that additional image captured 401 appears to have a different subject than the second subject in temporary template 312 as assessed by the low third matching score (e.g., below the third threshold). In some cases, this may be an indication that there was not an identity switch (e.g., change in the subject). In some cases, there may still be an identity switch. Since the subject in additional image captured 401, however, does not match the subject in temporary template 312, when the false alarm is determined, processes 300 and 400 may be reset (e.g., the temporary template will be cleared and process 300 may begin again with the next captured image and, potentially, process 400 may begin again).

If the third matching score is higher than the third threshold ("Y") in 404, then another matching score (e.g., a fourth matching score) may be assessed in 408. The fourth matching score may be a matching score between the additional image captured and the image captured immediately prior to the additional image (e.g., preceding image 409). In 410, the fourth matching score may be compared to yet another threshold (e.g., a fourth threshold). In some embodiments, the fourth threshold is substantially the same as the third threshold. If the fourth matching score is less than the fourth threshold ("N"), then the "false alarm" may be determined in 412.

If the fourth matching score is higher than the fourth threshold ("Y") in 410, then additional captured image 401 may be added into temporary template 312 (e.g., the feature vectors for the additional captured image are added to the feature vectors in the temporary template). In 416, the number of images (frames) in temporary template 312 may be counted and compared to a predetermined number of images. The predetermined number of images may be a number of images selected to provide a reasonable assessment that the identity of a subject has changed. In some embodiments, the predetermined number of images may also be selected based on properties of the device and/or the camera used in capturing images (e.g., a frame capture speed of the camera).

In 416, if the number of images in temporary template 312 is less than the selected number of images ("N"), then process 400 may continue at 402 with additional captured images 401. In certain embodiments, if the "false alarm" is determined in process 400 at any point in time before the selected number of images is reached in 416, the false alarm determination will reset process 300 and process 400 (e.g., temporary template 312 will be cleared and the processes will begin again).

If the number of images in temporary template 312 is equal to or greater than the selected number of images ("Y"), then process 400 may continue with assessing a distance between facial signatures (e.g., feature vectors) for the first subject (e.g., the subject in static template 216, shown in FIG. 4, generated by image enrollment process 200) and the subject in temporary template 312 in 418. The distance may be assessed by assessing distance between feature vectors for the first subject and the subject in temporary template 312. For example, the distance may be assessed by assessing an average distance between feature vectors for the first subject and the subject in temporary template 312.

In 420, the assessed distance may be compared to a threshold for the distance between the facial signatures for the first subject and the subject in temporary template 312. If the distance between the facial signatures is above the distance threshold ("Y"), then an identity switch between the subjects may be confirmed in 422. The identity switch may confirm that the identity of the first subject is different than the identity of the subject in temporary template 312. In certain embodiments, if the identity switch is confirmed in 422, image enrollment process 200 may be started over (e.g., static templates 216 and images are cleared from memory and the process is restarted). In some embodiments, when the identity switch is confirmed in 422, a notice or other prompt may be given to the user of the device that image enrollment process 200 is going to start over. For example, a user interface (UI) of the device may provide notification that the image enrollment process encountered an error and needs to be started over.

If the distance between the facial signatures is below the distance threshold ("N"), then process 300 and process 400 may be restarted. In some embodiments, if the distance between the facial signatures is below the distance threshold, temporary template 312 may be cleared (e.g., cleared from memory) and the feature vectors in the temporary template are no longer used. In some embodiments, if the distance between the facial signatures is below the distance threshold, temporary template 312 may be added to static template 216 for image enrollment process 200. A decision on whether temporary template 312 is cleared from memory or added to the template may involve comparison of the distance between the facial signatures to another threshold that is lower than the threshold used in 420.

In some embodiments, thresholds used in process 300 and/or process 400 may be tightened (e.g., thresholds are made stricter) by comparing images having selected pose and/or distance criteria. For example, template space 220, shown in FIG. 6, may include static templates 216 at multiple different angles or ranges of angles for the user in the images represented by the static templates. The angles or ranges of angles in template space 220 may be known. When images are captured during process 300 and/or process 400, pose and/or distance information in a captured image may be used to assess an angle of the user in the captured image. The assessed angle may then be used to compare the captured image to static templates 216 having a similar angle or angle range. Comparing the captured image to the template image(s) having similar angles may allow the threshold for matching between the images to be increased. In some embodiments, captured images with a more frontal view of the user (e.g., the user's pose is substantially facing the camera) may be more preferentially used as the signals in such images tends to be higher than the signals in images with the user in more of a side view pose.

Figure 9:
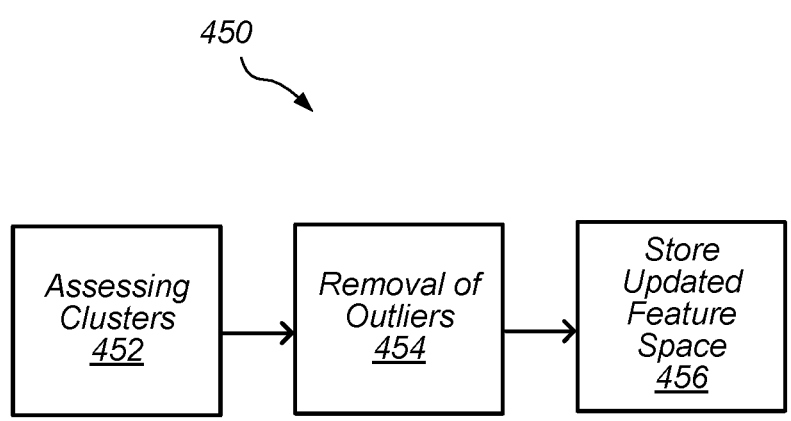
FIG. 9 depicts a representation of an embodiment of a clustering assessment process.

In certain embodiments, one or more processes are used after image enrollment process 200, shown in FIG. 4, to assess and remove facial signatures (e.g., feature vectors) that may have resulted from a switch in identities (e.g., subjects) during the image enrollment process. For example, assessment of the clustering of feature vectors in the feature space may be used to remove one or more feature vectors that result from a switch in identities. FIG. 9 depicts a representation of an embodiment of a clustering assessment process. In certain embodiments, process 450 is used to assess clustering of feature vectors in the feature space (e.g., feature space 212, shown in FIG. 5) to remove outlying feature vectors after image enrollment process 200 is completed/finished, shown in FIG. 4.

Figure 10:
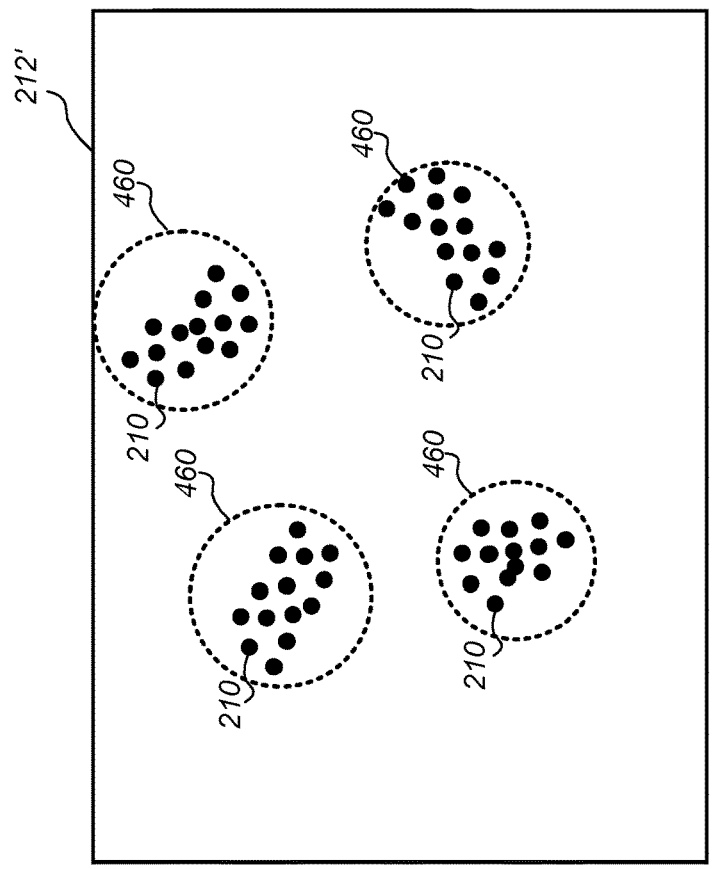
FIG. 10 depicts a representation of an embodiment of a feature space with a plurality of feature vectors in the feature space after an image enrollment process is completed.

As shown in FIG. 9, process 450 may begin with assessing clusters of feature vectors in the feature space in 452. FIG. 10 depicts a representation of an embodiment of feature space 212 with a plurality of feature vectors 210 in the feature space after image enrollment process 200 is completed. In certain embodiments, clusters of feature vectors 210 (represented by circles 460 in FIG. 10) are determined by assessment of the distribution of feature vectors in feature space 212. For example, statistical analysis of feature vectors 210 in feature space 212 may be used to assess clustering of the feature vectors and determine clusters 460. Statistical analysis may include, for example, classification algorithms operated on the feature vectors in the feature space.

In some embodiments, clusters 460 are defined based on characteristics of feature vectors 210 in feature space 212. For example, feature vectors may define facial features of the user's face in the captured images in a feature space. The feature vectors defining the facial features may then be assessed (e.g., decoded and/or classified) to determine pose and/or distance information for the captured images. Clusters 460 may then be defined based on unique characteristics from the pose and/or distance information. Using the pose and/or distance information may provide better definition of grouping for clusters 460 in feature space 212.

Clusters 460 may be, for example, groupings of feature vectors 210 that represent substantially similar facial signatures in feature space 212. In certain embodiments, feature vectors 210 inside clusters 460 are assessed as being feature vectors that represent the same subject (e.g., the clusters represent facial signatures for the user being authorized by the image enrollment process). Feature vectors 210 outside clusters 460 (e.g., outlying feature vectors 210' or outliers) may be assessed as being feature vectors that do not represent the user being authorized by the image enrollment process.

Figure 11:
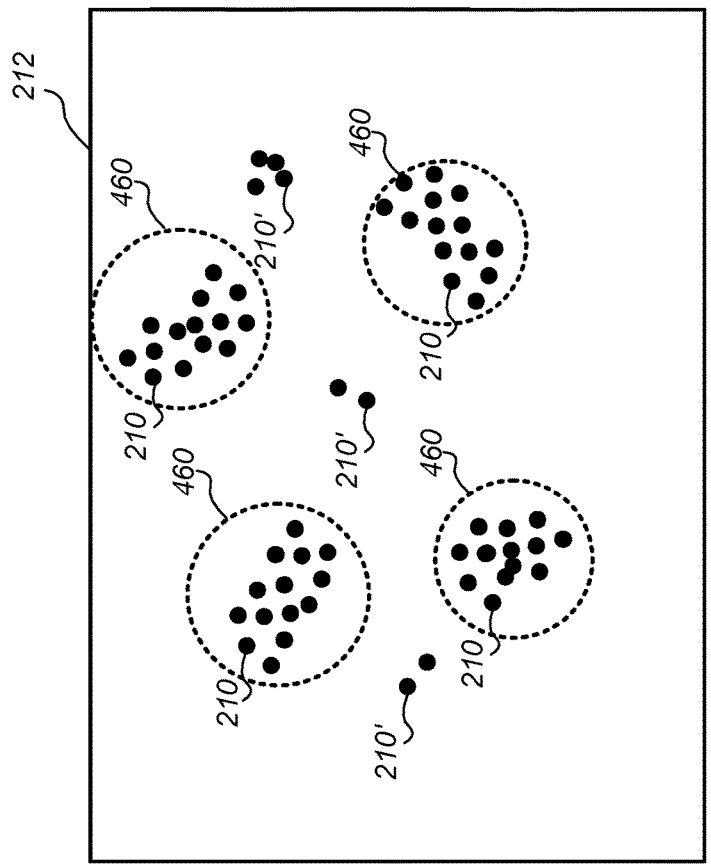
FIG. 11 depicts a representation of an embodiment of a feature space with a plurality of feature vectors in the feature space after removal of outlying feature vectors.

After assessment of clusters 460 in feature space 212, process 450, shown in FIG. 9, may continue with the removal of the outliers (e.g., feature vectors 210') from the feature space in 454. FIG. 11 depicts a representation of an embodiment of feature space 212' after the removal of outlying feature vectors. As shown in FIG. 11, feature space 212' (e.g., the updated feature space) only includes feature vectors 210 found in clusters 460. After the removal of the outliers, process 450, as shown in FIG. 9, may continue with storing the updated feature space (feature space 212') in the device (e.g., storing the updated feature space in a memory of the device) in 456. Feature space 212', as shown in FIG. 11, may then be used as the feature space with feature vectors for the authorized user in additional facial recognition processes on the device (e.g., a facial recognition authorization process).

Typically, the difference between facial signatures for a single subject (e.g., the authorized user) under different poses/motions is less than the difference between facial signatures for different subjects in the same pose/motion. Thus, removing the outlying feature vectors 210' (the outliers) may be more likely to remove feature vectors for a different subject than feature vectors for a different pose. Removing the outlying feature vectors 210' (whether they result from a different subject or some other factor) may improve the accuracy of a facial recognition authorization process using feature space 212'. For example, removing outlying feature vectors 210' may remove the likelihood of false positives in the facial recognition authorization process using feature space 212'.

In certain embodiments, one or more process steps described herein may be performed by one or more processors (e.g., a computer processor) executing instructions stored on a non-transitory computer-readable medium. For example, process 200, process 300, process 400, and process 450, shown in FIGS. 4, 7, 8, and 9, may have one or more steps performed by one or more processors executing instructions stored as program instructions in a computer readable storage medium (e.g., a non-transitory computer readable storage medium).

Figure 12:
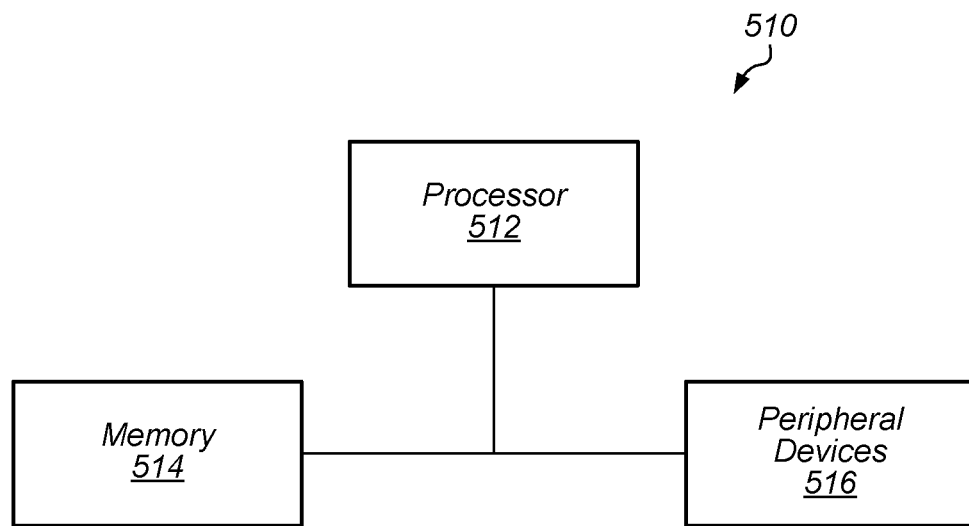
FIG. 12 depicts a block diagram of one embodiment of an exemplary computer system.

FIG. 12 depicts a block diagram of one embodiment of exemplary computer system 510. Exemplary computer system 510 may be used to implement one or more embodiments described herein. In some embodiments, computer system 510 is operable by a user to implement one or more embodiments described herein such as process 200, process 300, process 400, and process 450 shown in FIGS. 4, 7, 8, and 9. In the embodiment of FIG. 12, computer system 510 includes processor 512, memory 514, and various peripheral devices 516. Processor 512 is coupled to memory 514 and peripheral devices 516. Processor 512 is configured to execute instructions, including the instructions for process 200, process 300, process 400, and/or process 450, which may be in software. In various embodiments, processor 512 may implement any desired instruction set (e.g. Intel Architecture-32 (IA-32, also known as x86), IA-32 with 64 bit extensions, x86-64, PowerPC, Sparc, MIPS, ARM, IA-64, etc.). In some embodiments, computer system 510 may include more than one processor. Moreover, processor 512 may include one or more processors or one or more processor cores.

Processor 512 may be coupled to memory 514 and peripheral devices 516 in any desired fashion. For example, in some embodiments, processor 512 may be coupled to memory 514 and/or peripheral devices 516 via various interconnect. Alternatively or in addition, one or more bridge chips may be used to coupled processor 512, memory 514, and peripheral devices 516.

Memory 514 may comprise any type of memory system. For example, memory 514 may comprise DRAM, and more particularly double data rate (DDR) SDRAM, RDRAM, etc. A memory controller may be included to interface to memory 514, and/or processor 512 may include a memory controller. Memory 514 may store the instructions to be executed by processor 512 during use, data to be operated upon by the processor during use, etc.

Figure 13:
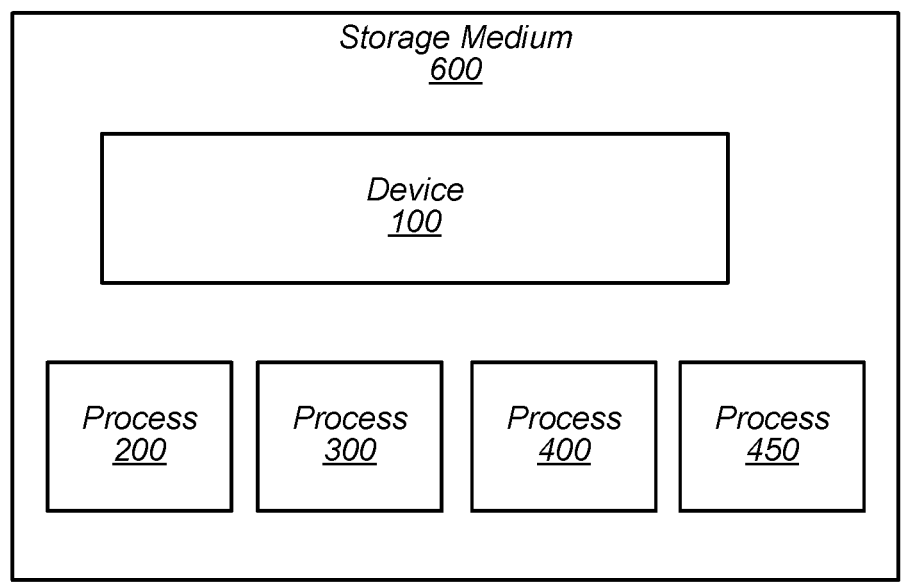
FIG. 13 depicts a block diagram of one embodiment of a computer accessible storage medium.

Peripheral devices 516 may represent any sort of hardware devices that may be included in computer system 510 or coupled thereto (e.g., storage devices, optionally including computer accessible storage medium 600, shown in FIG. 13, other input/output (I/O) devices such as video hardware, audio hardware, user interface devices, networking hardware, etc.).

Turning now to FIG. 13, a block diagram of one embodiment of computer accessible storage medium 600 including one or more data structures representative of device 100 (depicted in FIG. 1) included in an integrated circuit design and one or more code sequences representative of process 200, process 300, process 400, and/or process 450 (shown in FIGS. 4, 7, 8, and 9). Each code sequence may include one or more instructions, which when executed by a processor in a computer, implement the operations described for the corresponding code sequence. Generally speaking, a computer accessible storage medium may include any storage media accessible by a computer during use to provide instructions and/or data to the computer. For example, a computer accessible storage medium may include non-transitory storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g. synchronous dynamic RAM (SDRAM), Rambus DRAM (RDRAM), static RAM (SRAM), etc.), ROM, or Flash memory. The storage media may be physically included within the computer to which the storage media provides instructions/data. Alternatively, the storage media may be connected to the computer. For example, the storage media may be connected to the computer over a network or wireless link, such as network attached storage. The storage media may be connected through a peripheral interface such as the Universal Serial Bus (USB). Generally, computer accessible storage medium 600 may store data in a non-transitory manner, where non-transitory in this context may refer to not transmitting the instructions/data on a signal. For example, non-transitory storage may be volatile (and may lose the stored instructions/data in response to a power down) or non-volatile.

Further modifications and alternative embodiments of various aspects of the embodiments described in this disclosure will be apparent to those skilled in the art in view of this description. Accordingly, this description is to be construed as illustrative only and is for the purpose of teaching those skilled in the art the general manner of carrying out the embodiments. It is to be understood that the forms of the embodiments shown and described herein are to be taken as the presently preferred embodiments. Elements and materials may be substituted for those illustrated and described herein, parts and processes may be reversed, and certain features of the embodiments may be utilized independently, all as would be apparent to one skilled in the art after having the benefit of this description. Changes may be made in the elements described herein without departing from the spirit and scope of the following claims.

What is claimed is:

1. A method, comprising:
    capturing a first image using a camera located on a device, the device comprising a computer processor and a memory, wherein the first image comprises an image captured while illuminating a subject in the image with infrared illumination from a projector located on the device, the first image being captured during a facial recognition enrollment authorization process;
    determining whether the subject in the first image is a different subject than a reference subject from one or more images captured during the facial recognition enrollment authorization process prior to the first image being captured;
    in response to the subject in the first image being determined to be different than the reference subject, capturing one or more second images using the camera located on the device;
    determining whether a subject in the second images is the same subject as the subject in the first image; and
    restarting the facial recognition enrollment authorization process in response to the subject in the second images being determined to be the same subject as the subject in the first image.

2. The method of claim 1, wherein the infrared illumination comprises flood infrared illumination and speckle pattern infrared illumination.

3. The method of claim 1, wherein determining whether the subject in the first image is a different subject than the reference subject from the one or more images captured during the facial recognition enrollment authorization process prior to the first image being captured comprises:
   encoding the first image to generate first feature vectors defining features of the subject in the first image in a feature space; and
   comparing the first feature vectors in the feature space to reference feature vectors for the reference subject.

4. The method of claim 1, wherein determining whether the subject in the second images is the same subject as the subject in the first image comprises:
   encoding the first image to generate first feature vectors defining features of the subject in the first image in a feature space;
   encoding the second images to generate second feature vectors defining features of the subject in the second images in the feature space; and
   comparing the first feature vectors to the second feature vectors in the feature space.

5. The method of claim 1, further comprising capturing a predetermined number of second images before determining whether the subject in the second images is the same subject as the subject in the first image.

6. The method of claim 5, further comprising determining whether the subject in the predetermined number of second images comprises a different subject than the reference subject before restarting the facial recognition enrollment authorization process.

7. The method of claim 1, further comprising maintaining the reference subject in the facial recognition enrollment authorization process when the subject in the second images is a different subject from the subject in the first image.

8. A method, comprising:
   capturing a first set of images using a camera located on a device, the device comprising a computer processor and a memory, wherein the first set of images comprises one or more images captured while illuminating a face of a first subject in the images with infrared illumination from a projector located on the device, the first set of images being captured during a facial recognition enrollment authorization process;
   encoding the first set of images to generate first feature vectors defining features of the first subject in the first set of images in a feature space;
   capturing a second set of images using the camera located on the device, wherein the second set of images comprises one or more images captured while illuminating a face of a second subject in the images with the infrared illumination from the projector located on the device, the second set of images being captured during the facial recognition enrollment authorization process;
   encoding images in the second set of images as the images in the second set of images are captured, wherein encoding the images in the second set of images generates second feature vectors defining features of the second subject in the feature space;
   comparing at least some of the second feature vectors to one or more of the first feature vectors; and
   determining during the facial recognition enrollment authorization process, whether the second subject is a different subject from the first subject based on the comparison of at least some of the second feature vectors to one or more of the first feature vectors.

9. The method of claim 8, wherein comparing at least some of the second feature vectors to one or more of the first feature vectors comprises:
   assessing an average distance between the first feature vectors and the second feature vectors; and
   comparing the average distance to at least one threshold to determine whether the second subject is a different subject from the first subject.

10. The method of claim 8, wherein comparing at least some of the second feature vectors to one or more of the first feature vectors comprises:
    determining a matching score between the at least some second feature vectors and the one or more first feature vectors;
    assessing whether the matching score is below a threshold; and
    in response to the matching score being below the threshold, comparing the second feature vectors of at least one second image to the second feature vectors of at least one other second image captured prior to the at least one second image.

11. The method of claim 8, further comprising assessing clustering of the first feature vectors and the second feature vectors in the feature space, and removing feature vectors from the feature space that are outliers from the assessed clusters in the feature space, the feature space then being used as a feature space for facial recognition enrollment authorization using the device.

12. The method of claim 8, further comprising restarting the facial recognition enrollment authorization process in response to the second subject being determined to be a different subject from the first subject.

13. The method of claim 12, further comprising providing a notification on a display of the device that the facial recognition enrollment authorization process is being restarted.

14. The method of claim 8, wherein the second set of images comprises a set of images captured immediately following the first set of images.

15. The method of claim 8, wherein the infrared illumination comprises flood infrared illumination and speckle pattern infrared illumination.

16. A device, comprising:
    a camera;
    at least one illuminator providing infrared illumination;
    circuitry coupled to the camera and the illuminator, wherein the circuitry is configured to:
      capture a first image using the camera, wherein the first image comprises an image captured while illuminating a subject in the image with infrared illumination from the at least one illuminator, the first image being captured during a facial recognition enrollment authorization process;
      determine whether the subject in the first image is a different subject than a reference subject from one or more images captured during the facial recognition enrollment authorization process prior to the first image being captured;
      in response to the subject in the first image being determined to be different than the reference subject, capture one or more second images using the camera;
      determine whether a subject in the second images is the same subject as the subject in the first image; and
      restart the facial recognition enrollment authorization process in response to the subject in the second images being determined to be the same subject as the subject in the first image.

17. The device of claim 16, wherein the circuitry is configured to provide a notification on a display of the device that the facial recognition enrollment authorization process is being restarted.

18. The device of claim 16, wherein the at least one illuminator comprises a flood infrared illuminator and a speckle pattern infrared illuminator.

19. The device of claim 16, wherein the circuitry is configured to authenticate the reference subject to use the device in response to the subject in the second images being a different subject as the subject in the first image.

20. The device of claim 16, wherein the circuitry is configured to authenticate the reference subject to use the device in response to the subject in the first image being the same subject as the reference subject from the one or more images captured prior to the first image being captured.

* * * * *